United States Patent [19]

Takai et al.

[11] Patent Number: 4,833,674
[45] Date of Patent: May 23, 1989

[54] ARRANGEMENT FOR PROCESSING RECEIVED DATA IN TDMA COMMUNICATIONS SYSTEM AND METHOD THEREFOR A TDMA COMMUNICATIONS SYSTEM AND METHOD FOR RETRIEVING RECEIVED DATA IN A PRESET ORDER

[75] Inventors: Haruki Takai; Mikio Ujiie, both of Tokyo, Japan

[73] Assignee: NEC Corporation, Japan

[21] Appl. No.: 790,049

[22] Filed: Oct. 22, 1985

[30] Foreign Application Priority Data

Oct. 24, 1984 [JP] Japan .................. 59-223760

[51] Int. Cl.⁴ .............................................. H04J 3/06
[52] U.S. Cl. ...................................... 370/95; 370/104
[58] Field of Search ........................ 370/105, 95, 104; 455/12; 364/514

[56] References Cited

U.S. PATENT DOCUMENTS

| | | | |
|---|---|---|---|
| 3,730,998 | 5/1973 | Schmidt et al. | 370/104 |
| 3,772,475 | 11/1973 | Loffreda | 370/105 |
| 3,816,666 | 6/1974 | Tomozawa et al. | 455/12 |
| 4,135,060 | 1/1929 | Heckel et al. | 370/105 |
| 4,312,063 | 1/1982 | Warner | 370/104 |
| 4,332,026 | 5/1982 | Alvarez, II et al. | 370/104 |
| 4,370,648 | 1/1983 | Wagner et al. | 370/105 |
| 4,398,291 | 8/1983 | Hotta et al. | 370/104 |
| 4,599,720 | 7/1986 | Kunzinger | 370/104 |
| 4,713,804 | 12/1987 | Servel et al. | 370/66 |

*Primary Examiner*—A. D. Pellinen
*Assistant Examiner*—Geoffrey S. Evans
*Attorney, Agent, or Firm*—Laff, Whitesel, Conte & Saret

[57] ABSTRACT

In order to process data transmitted from a plurality of earth stations in a TDMA communications system with high speed, the data transmitted chronologically over a multiframe and written into a first memory according to first discriminating signals in a manner as to be grouped with respect to the earth stations, are then read out from the first memory according to second discriminating signals stored in a second memory irrespective of the received order. The data read out from the first memory are arranged in a manner as to be processed with ease in the subsequent unit.

2 Claims, 6 Drawing Sheets (a)

| A4' | A3' | A2' | A1' |
|---|---|---|---|
| | | | |
| | | | |
| An' | An-1' | An-2' | An-3' |

CORRESPONDING TO THE NUMBER OF BITS OF DATA BUS 17

FIG. 7

| CONTROL SIGNAL OF STATION "a" |
|---|
| " "b" |
| " "c" |
| " "d" |
| " "e" |

ARRANGEMENT FOR PROCESSING RECEIVED DATA IN TDMA COMMUNICATIONS SYSTEM AND METHOD THEREFOR A TDMA COMMUNICATIONS SYSTEM AND METHOD FOR RETRIEVING RECEIVED DATA IN A PRESET ORDER

BACKGROUND OF THE INVENTION

1. Field of The Invention

This invention relates to an arrangement for processing received data in a TDMA (Time Division Multiple Access) communications system and a method therefor, and more specifically to such an arrangement and method each of which features fast processing of received data and also allows the subsequent unit to handle same with high speed, and still more specifically to such an arrangement and method by which control information or signals (viz., control data) contained in bursts can be processed with high speed and high efficiency in the arrangement itself and in the subsequent unit.

2. Description of the Prior Art

In the TDMA system, each earth station (viz., reference or traffic station) transmits bursts in a manner that each burst is located within an allocated time slot of each consecutive TDMA frame. The burst therefore has the same period as the TDMA frame.

The control information or signal of each earth station is split up using time-division multiplexing and is chronologically transmitted within bursts over one multiframe which consists of a predetermined number of frames. The control signal is used for controlling and monitoring the equipments of the TDMA communications system. It is therefore necessary to extract the control signal of each earth station from the corresponding bursts to reproduce same at a receiving side before processing same.

According to one known method, the divided portions of control signals transmitted from multiple earth stations are extracted from consecutive frames of one multiframe in the receiving order, and are successively stored in an appropriate memory. The divided portions thus stored are read out, in the received order, from the memory during the next multiframe duration, and are combined to reproduce each control signal in order to be processed. Consequently, the prior art has encountered a problem that if the receiving order (the order of reception) changes or if the number of earth stations joining the TDMA system change, then it requires a large amount of time to process the control signals due to complex retrieval as well as change of processing order.

According to another known technique, the segments of control information are grouped according to their respective earth station and then stored. Thereafter, the control signal is processed using vacant time periods such as the guard time between bursts and open time slots not occupied by any earth station. However, this prior art has encountered difficulty in a manner similar to that described in connection with the aforesaid known method.

Further, with the recent advent of communicating via a satellite using a spot beam antenna, the accompanying increase of control information makes the aforesaid prior art problem even more outstanding in that an earth station is usually unable to receive its own transmitting data directly from same spot beam antenna.

SUMMARY OF THE INVENTION

It is therefore a primary object of this invention is to provide an improved arrangement and method each of which is free from the above described difficulty inherent in the prior art.

Another object of this invention is to provide an improved arrangement and method each of which features high speed processing of control signals and which can easily cope with (a) change of burst receiving order or (b) change in the number or membership of earth stations joining the system.

Still another object of this invention is to provide an improved arrangement and method each of which features high speed processing of received bursts and which can easily cope with (a) change of data receiving order or (b) change in the number of membership of earth stations joining the system.

A first aspect of this invention takes the form of an arrangement for processing data transmitted from a plurality of earth stations in a TDMA communications system, the data being split up by time-division multiplexing and being transmitted over a multiframe which consists of a plurality of frames, the divided portions of the data being specified in connection with earth stations by first discriminating signals, comprising: a first memory for storing the data transmitted over a multiframe; a second memory for storing second discriminating signals arranged in a predetermined order, the second discriminating signals corresponding to the first discriminating signals; a writing means for writing the data into the first memory means in the order received such that the data are grouped with respect to earth stations according to the first discriminating signals; and a reading means for reading out the data stored in the first memory, according to the second discriminating signals, within a multiframe following the multiframe within which the data are written in the first memory.

A second aspect of this invention takes the form of a method of processing data transmitted from a plurality of earth stations in a TDMA communications system, the data being split up by time-division multiplexing and being transmitted over a multiframe which consists of a plurality of frames, the divided portions of the data being specified in connection with earth stations by first discriminating signals, comprising the steps of: storing the data transmitted over a multiframe in a first memory; storing second discriminating signals arranged in a predetermined order in a second memory, the second discriminating signals corresponding to the first discriminating signals; writing the data into the first memory means in the order received such that the data are grouped with respect to earth stations according to the first discriminating signals; and reading out the data stored in the first memory, according to the second discriminating signals, within a multiframe following the multiframe within which the data are written in the first memory.

BRIEF DESCRIPTION OF THE DRAWINGS

The features and advantages of this invention will become more clearly appreciated from the following description taken in conjunction with the accompanying drawings in which:

FIG. 6 shows formats of the outputs of a data processor of the FIG. 1 arrangement; and FIG. 7 shows formats of the output of the FIG. 1 arrangement.

DETAILED DESCRIPTION OF THE PREFERRED EMBODIMENTS

Figure 1:
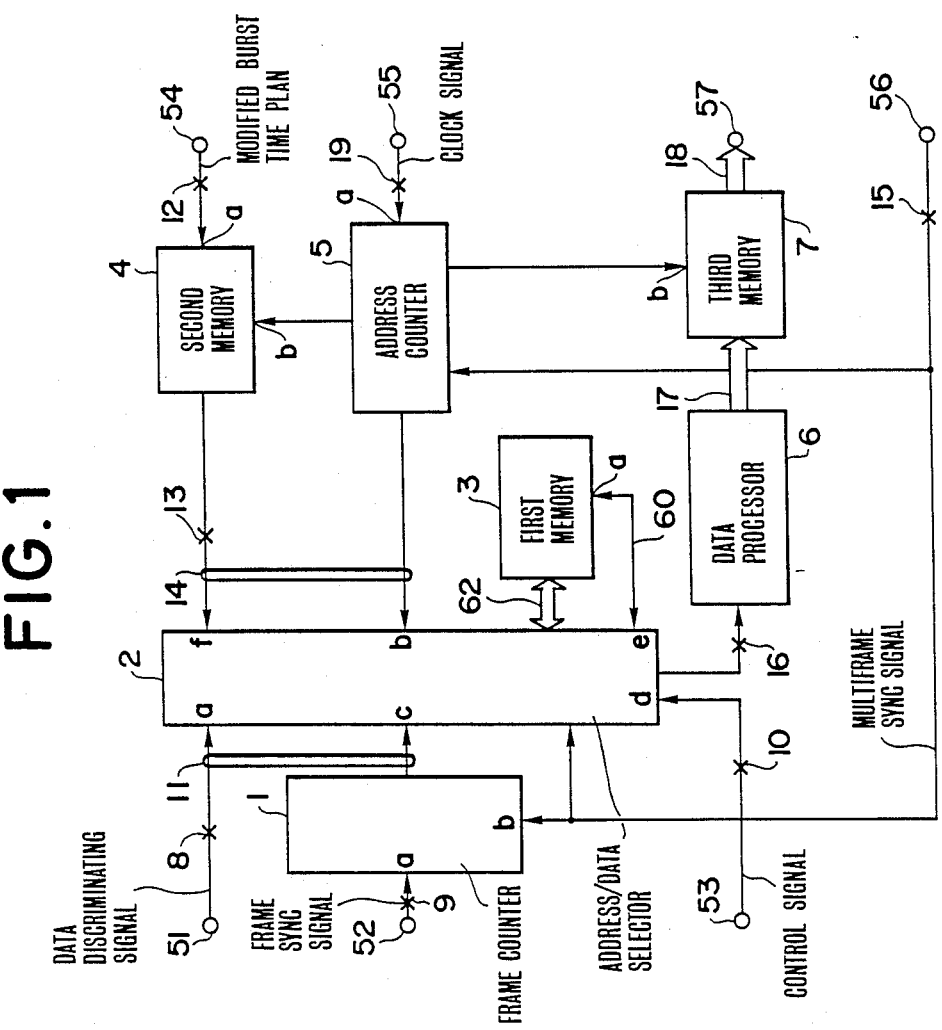
FIG. 1 is a block diagram showing an arrangement according to the present invention.

FIG. 1 shows, in block diagram form, a control signal processing arrangement according to this invention. The FIG. 1 arrangement comprises: a frame counter 1, an address/data selector 2, a first and second memories 3 and 4, an address counter 5, a data processor (e.g., a front end processor) 6, and a third memory 7, all of which are coupled as shown.

It should be noted that throughout this specification the term "data" is used in the sense as to include "information data" and "control data".

The frame counter 1 has an input (a) to which a frame sync signal 9 is applied via an input terminal 52, while having an input (b) to which a multiframe sync signal 15 is applied via an input terminal 56. The frame and multiframe sync signals 9 and 15 are generated from reference bursts transmitted from a reference station.

Figure 2:
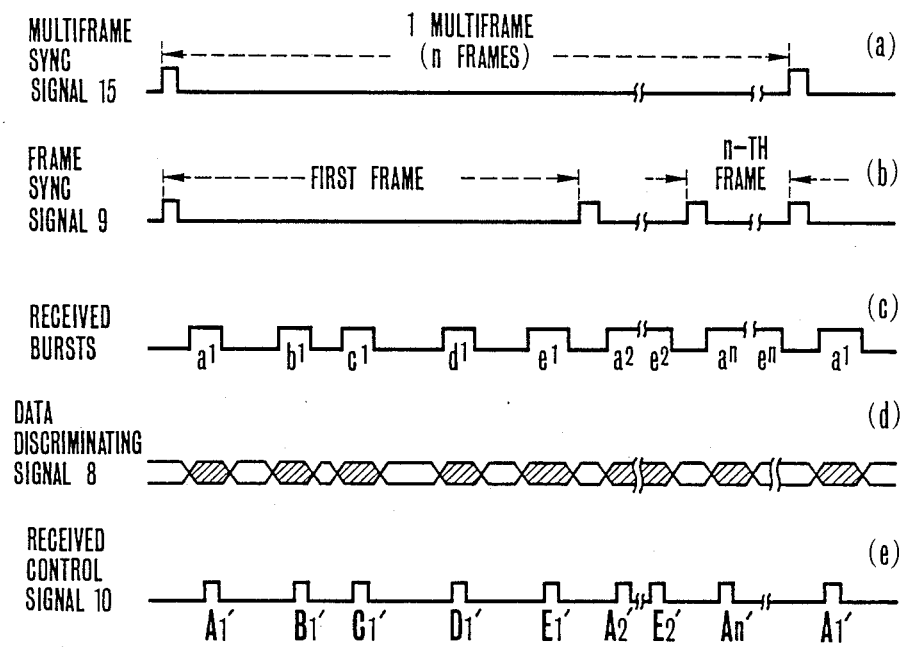
FIGS. 2(a) through 2(b) are timing charts of various signals for ease of understanding of the operation of the FIG. 1 arrangement.

FIGS. 2(a) and 2(b) show the timing charts of the two sync signals 15 and 9, respectively.

The frame counter 1 is initialized by the multiframe sync signal 15 and counts the number of frames using the frame sync signal applied thereto.

Figure 4:
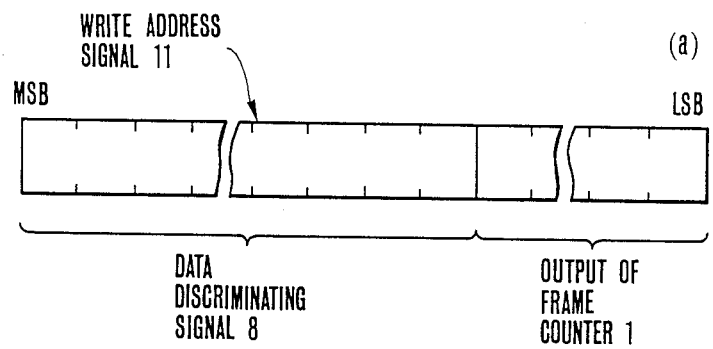
FIGS. 4(a) and 4(b) show respectively formats of write and read address signals applied to the first memory.
Figure 4:
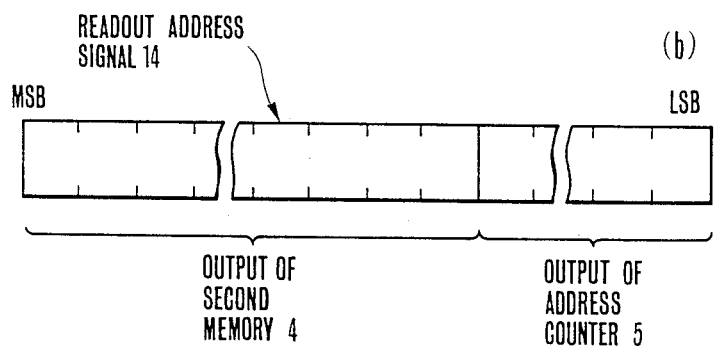

The address/data selector 2 receives, via an input terminal 51, a data discriminating signal 8 (see FIG. 2(d)) at its input terminal (a), and also receives the output of the frame counter 1 at its input (c). The data discriminating signal 8 specifies each received burst by determining which earth station transmitted a given burst. The data discriminating signal 8 and the output of the frame counter 1, forms in combination a write address signal 11 whose format is shown in FIG. 4(a). In FIG. 4(a), MSB and LSB indicate "Most Significant Bit" and "Least Significant Bit", respectively.

Figure 3:
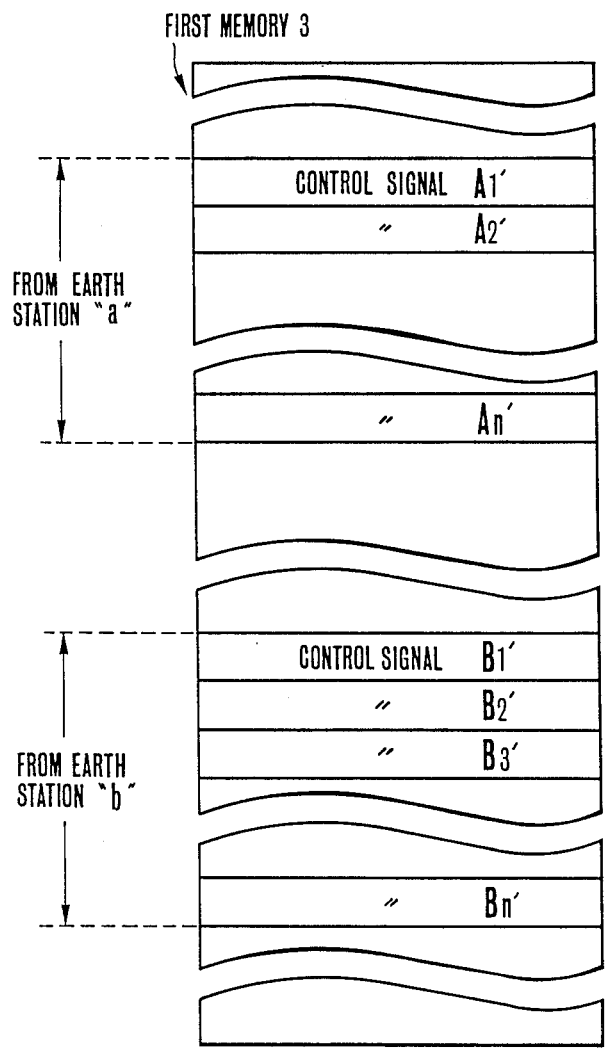
FIG. 3 is a memory map showing the arrangements of incoming control signals stored in a first memory which forms part of the FIG. 1 arrangement.

The control signals or data 10 (see FIG. 2(e)) are extracted from received bursts $a^1$, $b^1$, $c^1$, $d^1$, $e^1$, $a^2$, $b^2$, ..., $a^n$ and $e^n$ (see FIG. 2(c)), and thereafter are applied to an input (d) of the selector 2 via the terminal 53. The selector 2 is responsive to the write address signal 11 and stores successively the control signal 10 into the first memory 3 such that they are grouped according to their corresponding earth stations, as shown in FIG. 3. It should be noted in FIGS. 2(e) and 3 that each fraction of control signals is represented by a capital letter with a prime mark. A line 60, extending between a terminal (e) of selector 2 and a terminal (a) of the first memory 3, is provided for data transfer, while a bus 62 is provided for the write address signal 11 and a readout address signal 14.

The address counter 5 has an input (a) to which a clock signal 19 is supplied via an input terminal 55, and applies its output to the address/data selector 2, the second memory 4 and the third memory 7, via their respective inputs (b), as address signals. The address counter 5 is initialized by the multiframe sync signal 15.

Figure 5:
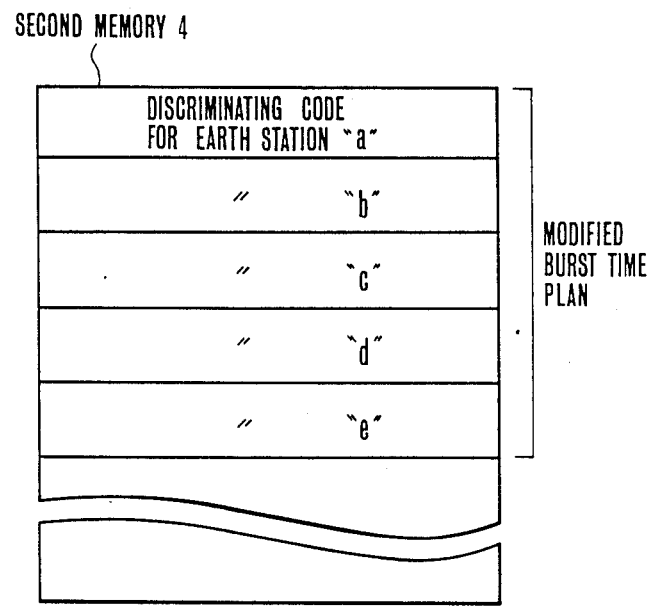
FIG. 5 is a simplified memory map showing a modified burst time plan stored in a second memory included in the FIG. 1 arrangement.

The second memory 4 is arranged to store a modified Burst Time Plan (mBST) 12 which is applied to the input (a) of the memory 4 via an input terminal 54. The mBST 12 is a plurality of discriminating signals each of which specifies the earth station. FIG. 5 is a simplified memory map of the second memory 4 showing the arrangements of discriminating signals for specifying earth stations "a", "b", "c", etc. The output 13 of the second memory 4 and the output of the address counter 5, form in combination the readout address signal 14 which is applied to inputs (b) and (f) of the address/data selector 2.

The operation of the FIG. 1 arrangement will be described in more detail hereinlater.

The incoming control signals 10 are successively written into the first memory 3, via the address/data selector 2, under the control of the write address signal 11. More specifically, the control signals 10 are grouped into the signals such that each group includes a number of bits (fractions) of the control signal from the same earth station. It has been assumed that "n" earth stations join the TDMA system, and hence the sections of the control signal within same frame are stored apart by "n" addresses, as shown in FIG. 3.

The control signal 10 stored in the first memory 3 is read out, during the next multiframe, according to the readout address signal 14. The format of the readout address signal 14 is shown in FIG. 4(b). The output 13 of the second memory 4 discriminates between the earth stations, while the output of the address counter 5 indicates the readout order of the segments of control signal of each specified earth station.

As known, if the Burst Time Plan changes, the order of the receiving data changes accordingly. However, according to this invention, although a new modified Burst Time Plan is applied to the second memory 4 every change of the Burst Time Plan, the content of the modified Burst Time Plan remains unchanged as long as the number of and/or membership of earth stations joining the TDMA system does not change, and hence the order of the earth station discriminating signals stored in the memory 4 maintained unchanged. This means that the control signals are read out in the predetermined order even if the transmitting order of the bursts changes. On the other hand, in the event that the one or more of the earth station members change, the modified Burst Time Plan changes accordingly and is maintained constant until next change occurs.

When the address counter 5 is initialized by the multiframe sync signal 15, the second memory 4 outputs the discriminating signal for the station "a" in response to the output of the address counter 5. Therefore, the first series of bits of fraction "$a^1$" of the control signal is read out from the first memory 3 into the data processor 6. Thereafter, the address counter 5 counts up by one in response to the next clock pulse. Thus, the next memory area is addressed whereby the series of bits or the fraction "$a^2$" of the control signal 10 is read out from the first memory 3.

This operation continues until the address counter 5 counts up to "n" when the fraction "$a^n$" is read out from the first memory 3. The address signal applied to the second memory 4 advances by one every "n" clock pulses, and hence the discriminating signals stored in the memory 4 are successively outputted every "n" clock pulses. Thus, the stored control signals are successively read out in series from the first memory 3 into the data processor 6, which in turn arranges the received control signals in parallel and then applies the arranged control signals to the third memory 7 via a bus 17. FIG. 6 shows the arrangement of the fractions of the control signal Al' to An' stored in the third memory 7. The third memory 7 applies, via a bus 18, the arranged control signals in parallel to the following processing unit via an output terminal 57. FIG. 7 shows schematically the format of the output of the third memory 7.

It will be understood that this invention has the following advantages: (a) addressing when the control signals are read out from the first memory 3 is very simple in that the readout order is maintained constant except when the earth stations joining the TDMAs system change and (b) the signal processing time at the unit provided after the FIG. 1 arrangement can be improved in time in that the order of the control signals applied from the FIG. 1 arrangement is maintained constant.

The foregoing description shows only one preferred embodiment of the present invention. Various modifications are apparent to those skilled in the art without departing from the scope of the present invention which is only limited by the appended claims.

What is claimed is:

1. An arrangement for processing data which is transmitted from a plurality of earth stations in a DMA communications system, the data being split up by time-division multiplexing and being transmitted in a multiframe format which consists of a plurality of frames, the divided portions of said data being specified in connection with earth stations by first discriminating signals, said arrangement comprising:

first memory means for successively storing the data transmitted over a multiframe;

second memory means for successively storing second discriminating signals arranged in a predetermined order, the contents of said second memory means remaining unchanged until the number of and/or membership of the earth stations changes;

writing means for writing said data into said first memory means in the order received such that said data are grouped with respect to earth stations according to said first discriminating signals;

reading means for reading out in series said data stored in said first memory means in a predetermined order, according to said second discriminating signals, within a multiframe following the multiframe within which said data are written in said first memory means;

data processing means coupled to said first memory means and performing serial-to-parallel conversion of the data which was read out in series from said first memory means; and third memory means for storing parallel data outputted from said data processing means.

2. A method of processing data transmitted from a plurality of earth stations in a TDMA communications system, the data being split up by time-division multiplexing and being transmitted in a multiframe format which consists of a plurality of frames, the divided portions of said data being specified in connection with earth stations by first discriminating signals, said method comprising the steps of:

successively storing the data transmitted over a multiframe in first memory means;

storing second discriminating signals arranged in a predetermined order in second memory means, the contents of said second memory means remaining unchanged until the number of and/or membership of the earth stations changes;

writing said data into said first memory means in the order received such that said data are grouped with respect to earth stations according to said first discriminating signals;

reading out in series said data stored in said first memory means in a predetermined order, according to said second discriminating signals, within a multiframe following the multiframe within which said data are written in said first memory means;

performing serial-to-parallel conversion of the data which was read out in series from said first memory means; and storing parallel data obtained by said serial-to-parallel conversion in third memory means.

* * * * *